United States Patent
Okamura

[11] Patent Number: 5,831,781
[45] Date of Patent: Nov. 3, 1998

[54] METHOD AND APPARATUS FOR DETECTING FLYING HEIGHT VARIATION OF HEAD IN DISK STORAGE SYSTEM

[75] Inventor: Hiroshi Okamura, Tokyo, Japan

[73] Assignee: Kabushiki Kaisha Toshiba, Kanagawa-ken, Japan

[21] Appl. No.: 596,663

[22] Filed: Feb. 5, 1996

[30] Foreign Application Priority Data

Nov. 15, 1995 [JP] Japan .................................. 7-296929

[51] Int. Cl.⁶ .............................. C11B 27/36; C11B 5/02; C11B 21/02
[52] U.S. Cl. ................................. 360/31; 360/61; 360/75
[58] Field of Search .............................. 360/31, 75, 103, 360/67

[56] References Cited

U.S. PATENT DOCUMENTS

| | | | |
|---|---|---|---|
| 4,777,544 | 10/1988 | Brown et al. ............................. | 360/75 |
| 4,841,389 | 6/1989 | Hoyt et al. ............................... | 360/75 |
| 4,872,071 | 10/1989 | Easton et al. ............................. | 360/31 |
| 4,931,887 | 6/1990 | Hedge et al. ............................. | 360/75 |
| 5,130,866 | 7/1992 | Klaassen et al. ......................... | 360/75 |
| 5,150,050 | 9/1992 | Genheimer et al. ..................... | 324/212 |
| 5,168,413 | 12/1992 | Coker et al. ............................. | 360/75 |

*Primary Examiner*—Aristotelis M. Psitos
*Assistant Examiner*—Regina Y. Neal
*Attorney, Agent, or Firm*—Limbach & Limbach L.L.P.

[57] ABSTRACT

The feature of the present invention lies in the point that a flying height variation of a head is checked by use of a read signal sent from the head so as to easily detect the flying height out of an allowable range, so that the generation of an abnormal data writing/reading operation is prevented in advance with result that data writing/reading operation can be surely realized in an interior of a HDD. There is provided a system in which a read signal obtained when data recorded in a disk 1 is read by a head 2 is input, and the flying height variation of the head is checked by use of a DC voltage of a gain control signal of an AGC circuit of a data reading processing circuit for executing a predetermined data reading processing. A CPU 11 converts a DC voltage level of the gain control signal of the AGC circuit to digital data by an A/D converter so as to check the flying height variation of the head. The CPU 11 compares the level value of the input gain control signal with threshold data DT stored in a memory. When the compared value exceeds the allowable range, the CPU 11 outputs a detection signal FS of the flying height variation for designating that an amount of the flying height of the head is abnormally varied.

8 Claims, 9 Drawing Sheets

| HEAD NUMBER | ZONE NUMBER | THRESHOLD (DT) |
|---|---|---|
| 0 | 0 | $DT0 \begin{pmatrix} DT0max \\ DT0min \end{pmatrix}$ |
|   | ⋮ |   |
|   | n |   |
| 1 | 0 |   |
|   | ⋮ |   |
|   | n |   |
| ⋮ | ⋮ | ⋮ |
| m | 0 |   |
|   | ⋮ |   |
|   | n | $DTN \begin{pmatrix} DTNmax \\ DTNmin \end{pmatrix}$ |

F I G. 5

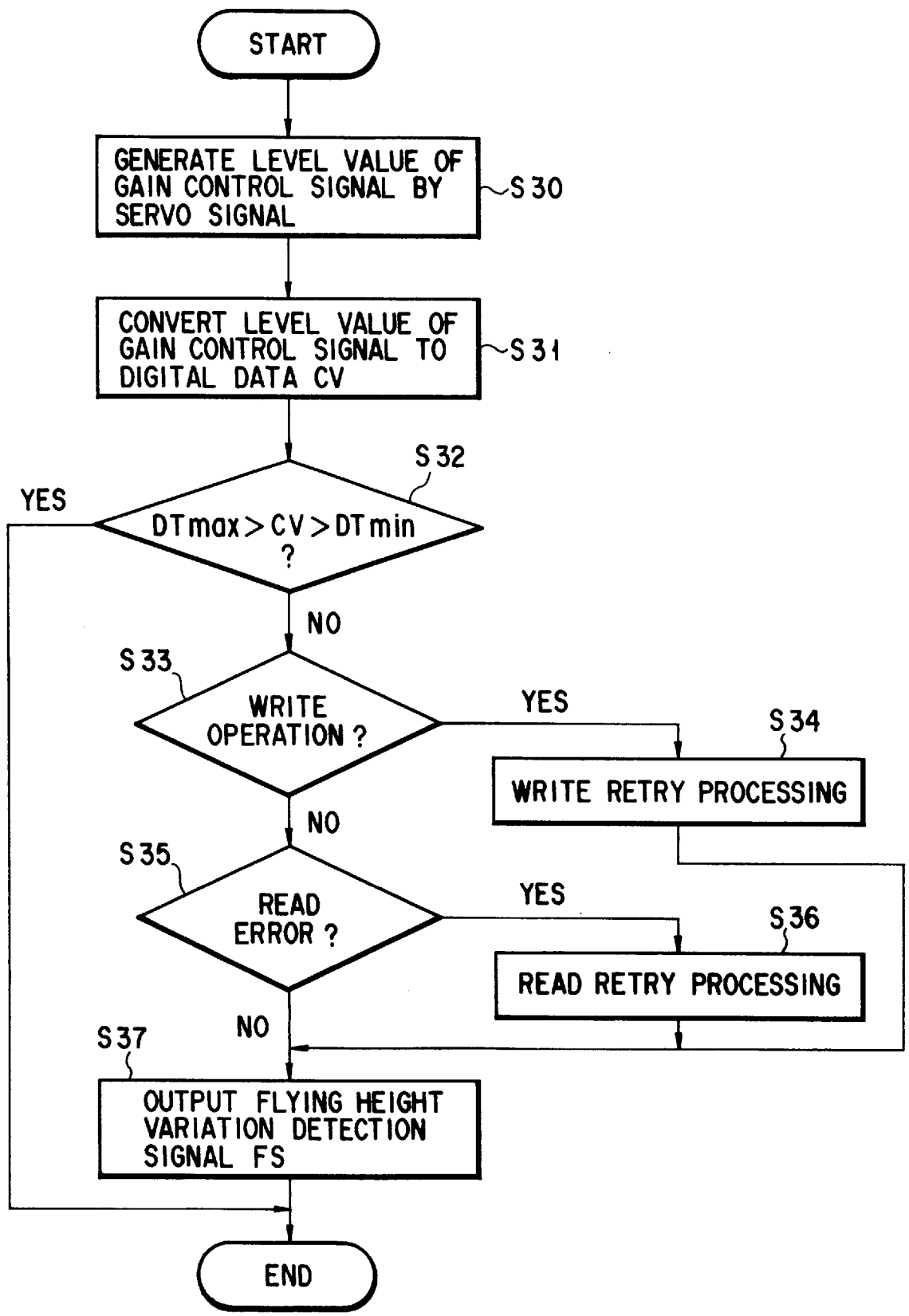
F I G. 8

REGISTER

| | | |
|---|---|---|
| WRITE INHIBIT FLAG WP | | 1 |
| HEAD NUMBER 0 | ZONE NUMBER 0 | 0 |
| | ZONE NUMBER n | 1 |
| ... | ... | ... |
| HEAD NUMBER m | ZONE NUMBER 0 | 0 |
| | 1 | 1 |
| | 2 | 1 |
| | n | 0 |

F I G. 11

METHOD AND APPARATUS FOR DETECTING FLYING HEIGHT VARIATION OF HEAD IN DISK STORAGE SYSTEM

BACKGROUND OF THE INVENTION

1. Field of the Invention

The present invention relates to a disk storage system, which is applied to, for example, a hard disk device, for writing/reading data to/from the disk in a state that a head is flying above a surface of the disk, and particularly to a disk storage system having a function for detecting a flying height variation of the head.

2. Description of the Related Art

Conventionally, in a disk writing/reading apparatus, for example, a hard disk device (HDD), a magnetic head (hereinafter simply called "head") for writing/reading data to/from a disk, serving as a writing medium is provided.

The head is held by a head actuator, and writes/reads data to/from a disk in a state that the head is flying above a surface of the disk to have a predetermined height. The height between the head and the disk is called a flying height of the head. The head actuator is driven by a voice coil motor so as to move the head in a radial direction of the head.

Particularly, in the HDD, an output characteristic of a read signal from the head (level of the read signal) is one of important factors for deciding the performance of the device, and a sufficiently high reproduction output is required. The output characteristic of the head largely depends on an amount of the flying height of the head in addition to the characteristic of the head itself. Regarding the head itself, an attention has been paid to a magnetoresistive head (MR head), which can obtain relatively higher level than an induction head.

Regarding the relationship between the output characteristic of the head and the flying height, the following point is confirmed.

More specifically, in a case where the amount of the flying height is $\lambda$, and a writing wavelength of data on the disk is A, an output level Ep (dB) of the head is proportional to "$-55*(d/\lambda)$." The value of "$-55$" is a logical value, which is disclosed in, for example, "The reproduction of magnetically recorded signals by R. L. Wallance, described in BSTJ,30,1951, pp. 1145–1173."

In other words, if the amount of the flying height is increased, the output level Ep (dB) of the disk is decreased. Conversely, if the amount of the flying height is decreased, the output level Ep (dB) of the disk is increased. Therefore, at the time of the reading operation in which data is read from the disk, it is preferable that the output level Ep (dB) of the head be increased as the amount of the flying height is decreased. Also, at the time of the data writing operation, if the amount of the flying height is increased, a function of a magnetic field, which is generated from the head, becomes insufficient, the magnetic filed of writing a magnetic flux cannot be sufficiently obtained on the disk. Due to this, data writing magnetization on the disk is worsened. As a result, the data reading may be unstable.

On the other hand, on the surface of the disk, projections (fine concave and convex portions), which is called texture, are present. Due to this, if the flying height is reduced, the head comes in contact with the texture when the head is flying above the disk. As a result, there is high possibility that wear and damage of the head may be generated.

By the way, in an HDD of a contact start stop system (CSS), in a standby state that the head is in the CSS area (innermost peripheral side), the head comes in contact with the CSS area. The above-mentioned texture is needed to prevent from the generation of absorption when the head comes in contact with the CSS area.

For the above-mentioned reason, regarding the setting value of the flying height of the head, the height of the texture, which exists on the disk, becomes a lower limit value, and a value by which the sufficient output level of the head can be obtained, becomes an upper limit value. Therefore, an allowable range of the flying height of the head is defined by the above-mentioned upper and lower limit values.

As mentioned above, in the HDD, it is needed that the flying height of the head to the disk be set to a predetermined allowable range. However, actually, even if the flying height of the head is set to the predetermined allowable range, it is confirmed that the flying height of the head is varied by influence of, for example, dust generated in the HDD.

In a case where the variation of the flying height of the head exceeds the allowable value, a probability becomes high in a point that a read error will be generated by the reduction of the output level of the head at the time of the read operation. Also, at the time of the writing operation, data writing magnetization is worsened, thereby breakage of data may be resultingly caused.

Due to this, in the manufacturing process of HDD, the head is mounted to set the flying height to a predetermined allowable range to product the HDD. Thereafter, the flying height of the head is measured, and it is detected whether or not the measured value is within the allowable range. As a measuring or a detecting system, there are used a method using an optical interference, a method using a spectrum analysis of a read signal waveform, and a method for measuring a half width value of the read signal. Also, there is proposed a method in which a speed of the disk is changed, and the flying height of the head at the time of the constant speed of the head is estimated from the speed when the head collides with the disk.

The above-mentioned methods are described in, for example, IEE Trans. on Instrumentation and Measurement, vol. 43, No. 2, April, 1994 (Klass B. Klasssen et al, "Slider-Disk Clearance Measurements in Magnetic Disk Drives Using the Readback Transducer").

However, in any methods, a measuring instrument such as a dedicated tester is needed. Or, it is needed that a complicated circuit for realizing the above-mentioned methods be added to a data writing/reading processing circuit of the HDD. In other words, there has not been developed a method for detecting the flying height of the head in the HDD.

SUMMARY OF THE INVENTION

An object of the present invention is that a variation of a flying height of a head is monitored by use of a read signal sent from the head in a HDD, and generation of the variation, which is out of an allowable range, is easily detected. Thereby, the generation of the abnormal data writing/reading operation, which is caused by the generation of the variation which is out of the allowable range, can be prevented in advance. The present invention is an apparatus for monitoring an abnormal variation of the flying height of the head by use of a gain control signal of an amplifier having an automatic gain control function included in a read signal processing circuit, which inputs a read signal obtained when data written in a disk is read from the head, and which executes a predetermined read signal processing.

More specifically, according to the present invention, there can be provided an apparatus comprising amplifying means, having an automatic gain control function of generating a gain control signal for automatically varying a gain based on a level of a read signal output from the head, for maintaining the level of the read signal output from the head to be a predetermined level when data is read from the disk by the head; monitoring means for monitoring the level of the gain control signal; and detecting means for detecting that the flying height of the head is varied out of an allowable range when the level of the gain control signal exceeds a predetermined allowable range, so as to generate a detection signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a conceptual view showing the content of a storage of a memory of the first embodiment of the present invention;

FIG. 8 is a flow chart explaining an operation of a second embodiment of the present invention;

FIG. 11 is a conceptual view showing the content of a storage of a memory of the fourth embodiment of the present invention.

DETAILED DESCRIPTION OF THE PREFERRED EMBODIMENTS

Embodiments of the present invention will be explained with reference to the drawings.

(System Structure)

Figure 1:
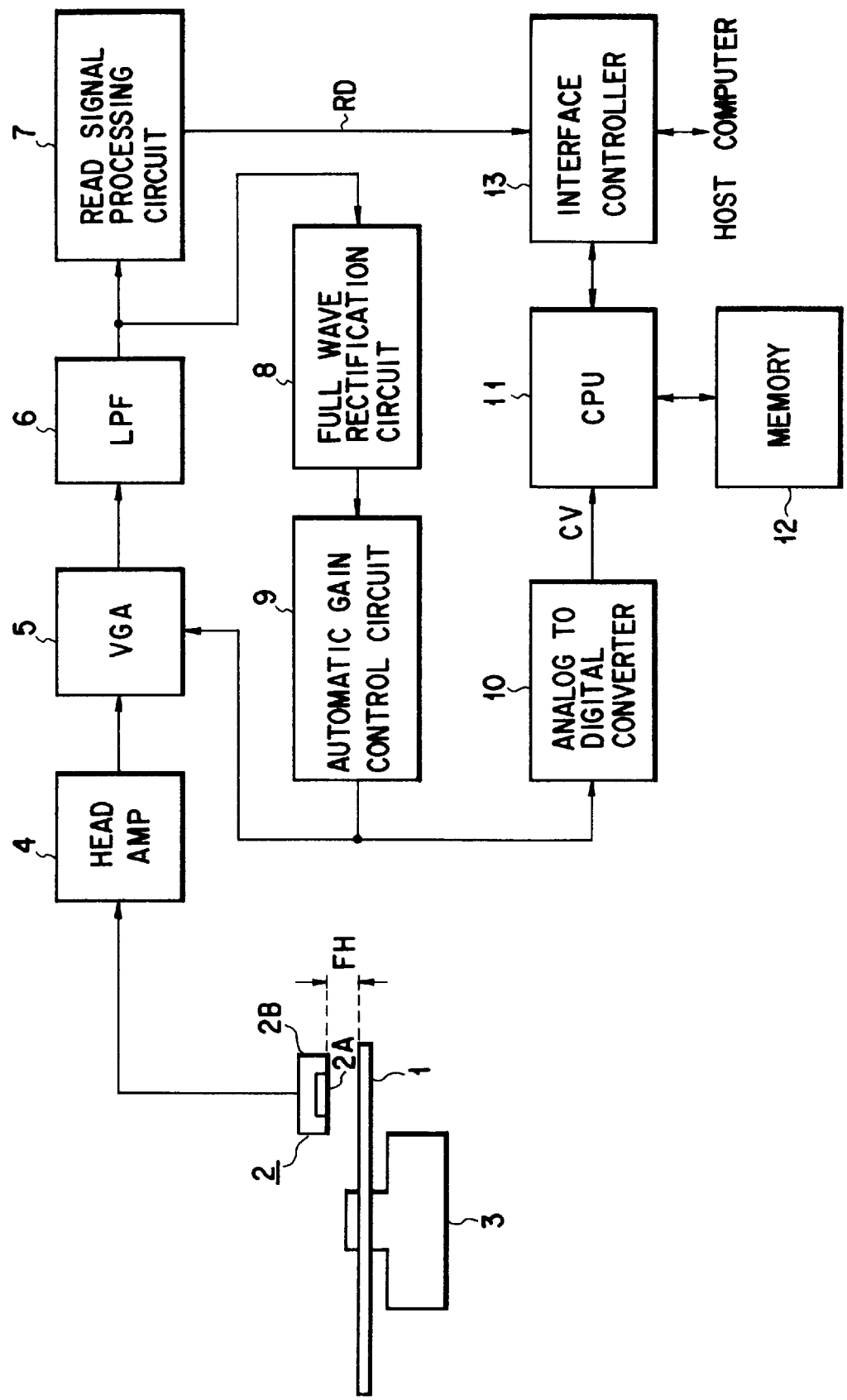
FIG. 1 is a block diagram showing a main part of a disk storage system of the present invention.

FIG. 1 is a block diagram showing a main part of a disk storage system of the present invention.

This embodiment shows a disk storage system in which a read signal processing circuit using read channel of a PRML (Partial Response Maximum Likelihood) system is provided, and a HDD using a sector servo system is estimated.

The above system comprises a disk 1, a head 2, a data read processing circuit, a microprocessor (CPU) 11, a memory 12, and an interference controller 13.

Figure 4:
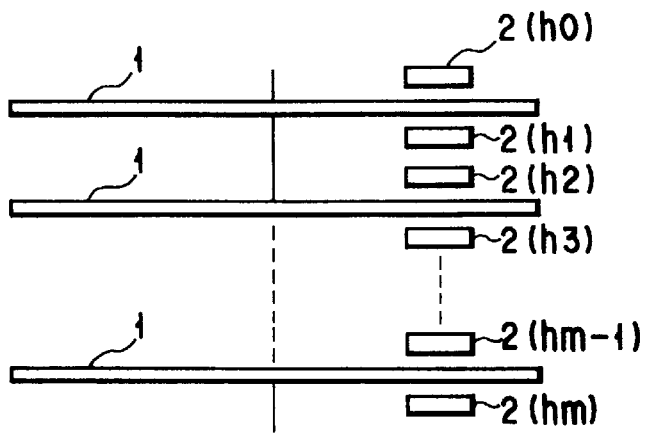
FIG. 4 is a conceptual view showing the relationship between a disk and a head of the present invention.

The disk 1 is a writing medium, which is rotated at high speed to magnetically record data to be recorded by the head 2. As shown in FIG. 4, a plurality of disks 1 is fixed to a spindle motor 3 to have a predetermined distance in an axial direction.

Figure 3:
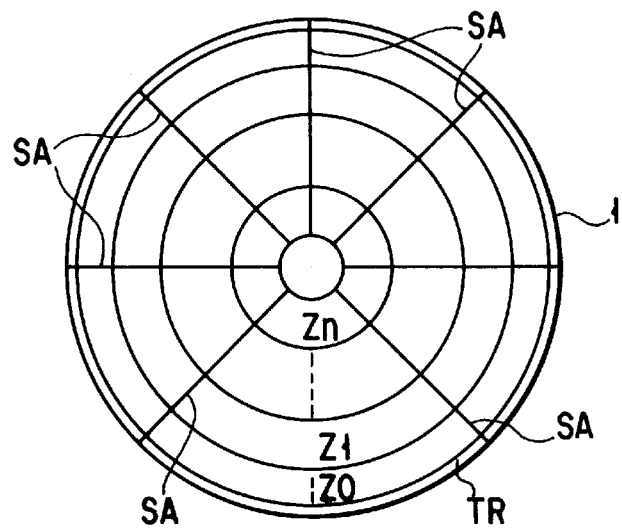
FIG. 3 is a conceptual view explaining a format structure of a disk of the present invention.

In the disk 1, a large number of concentric tracks is formed. For example, there is formed a format structure in which the respective tracks are divided to about 50 sectors. Moreover, according this embodiment, as shown in FIG. 3, the large number of tracks TR are divided to a plurality of zones z0 to zn (0 to mean zone numbers) based on the estimation of the format structure of a CDR (constant density writing) system. In the CDR system, the number of sectors, and data transfer speed differ depending on the respective zones z0 to zn.

The head 2 is a combined head of a writing/reading separation type having a MR head 2A dedicated to a read operation and an induction-typed thin film (not shown) for writing operation. Then, the head 2 is mounted on a slider 2B. As shown in FIG. 1, in a state that the head 2 is flied at a position where a predetermined flying height (FH) is separated from the surface of the disk 1, data is read/reproduced to/from the disk 1.

As shown in FIG. 4, the head 2 is provided to each of the data writing surfaces (front and back surfaces) of one disk 1. In this case, h0 to hm mean head numbers.

The plurality of heads 2 is structured to be simultaneously moved in a radial direction of the disk 1 by a head actuator (not shown). The head actuator is driven to be rotated by a voice coil motor.

The data read processing circuit comprises a gain variable amplifier (VGA) 51 an automatic gain control circuit 9 for automatically controlling the gain, a low pass filter 6, a read signal processing circuit 7, and a full wave rectification circuit (FWR) 8.

The VGA 5 is an amplifying circuit for maintaining a level of the read signal output from the head amplifier 4 to be a predetermined level. The LPF 6 is a filter for removing high frequency noise of the read signal.

The read signal processing circuit 7 is a signal processing circuit for reading the read output from the LPF 6 as digital reading data (e.g., NRZ code) RD by use of a PRML system. Reproduced data RD is transferred to a host computer through an interface controller 13.

In other words, the read signal processing circuit 7 comprises a PR equalizer having a digital filter (FIR filter), an A/D converter, a Viterbi decoder, and a writing decoder. The writing decoder is a circuit for decoding data sequence estimated by the Viterbi decoder to a code (normally, an NRZ code) of writing data.

The interface controller 13 is also called a disk controller (HDC), and has a function serving as a data writing/reading control and a host interface. In this embodiment, the interface controller 13 inputs a detection signal FS of flying height variation output from the CPU 11 so as to execute a write inhibit processing and an alarm processing (to be described later).

The FWR 8 rectifies a read signal, serving as an output signal of the LPF 6. The AGC circuit 9 comprises an integration circuit having an operation amplifier so as to integrate an output signal of the FWR 8, thereby extracting a direct current component to be output as a gain control signal (DC voltage) for controlling gain.

The VGA 5 executes an amplifying processing in order that the gain is controlled by the control voltage output from the AGC circuit 9 so as to maintain the level of the read signal, serving as an input signal, to be a predetermined value.

Moreover, the system of this embodiment comprises an A/D converter 10 for converting the gain control signal (DC voltage) for controlling the gain output from the AGC circuit 9 to a digital data CV so as to be output to the CPU 11.

The A/D converter 10 generates digital data CV, which corresponds to the gain control signal of the AGC circuit 9, as measuring data necessary for the detecting operation of the flying height variation of the head in connection with this embodiment.

The CPU 11 checks whether or not the level value of the gain control signal is in the allowable range from digital data CV based on threshold data DT (reference value data) stored in the memory 12 in advance. Then, if the result value is out of the allowable range, the CPU 11 executes a detection processing of the flying height variation to output the detection signal FS of the flying height variation (to be described later).

(Calculation Processing of Threshold Data DT)

Figure 6:
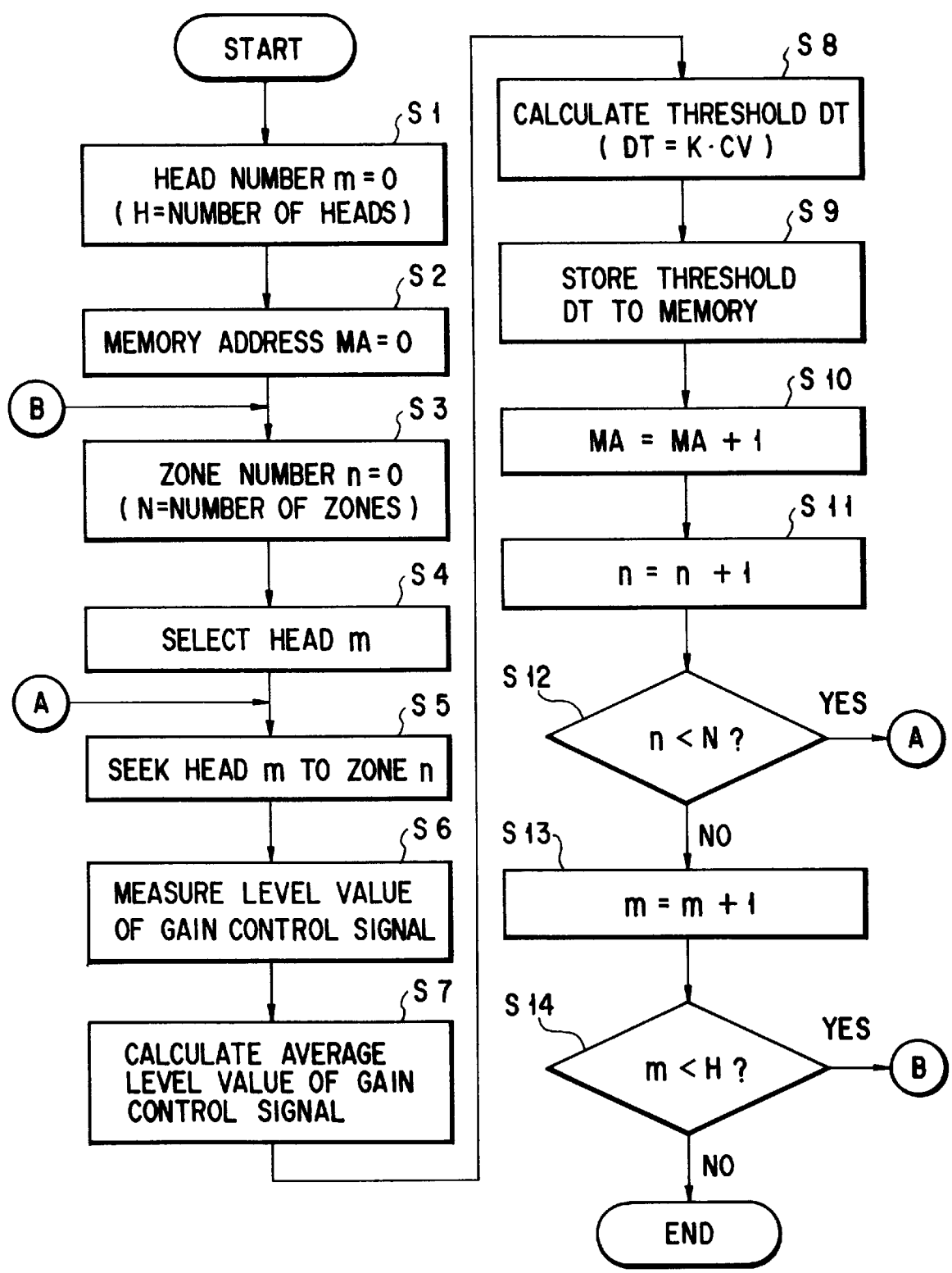
FIG. 6 is a flow chart explaining a calculation method of threshold data of the first embodiment of the present invention.

According to this embodiment, the CPU 11 executes the detection processing of the flying height variation based on threshold data DT (reference value data) stored in the memory 12 in advance. The following will explain the calculation processing of threshold data DT with reference to FIGS. 5 and 6.

First, the CPU 11 executes a processing for setting an initial value (steps S1 to S3). In this case, as shown in FIG. 4, a number of heads is H, and a head number m is allocated to each of the heads 2. The CPU 11 selects a head by designating head number m.

The memory address of the memory 12 for storing threshold data DT is set to MA. Moreover, as shown in FIG. 3, the number of zones formed in the disk 1 is set to N, and a zone number n is allocated to each of the zones.

The CPU 11 selects the head 2 having a head number m (for example, m=0) so as to be sought to a zone whose zone number n (for example, n=0) on the disk 1 (steps S4, S5).

The CPU 11 executes the reading operation of data from the plurality of tracks of the designated zone (number 0) by the selected head 2 (number 0). In the data reading operation, the head 2 reads servo data from a servo area set in each of the tracks.

Then, as shown in FIG. 3, in a sector servo system of this embodiment, servo areas SA are arranged on the whole tracks on the disk 1 to have a predetermined distance. In the servo areas SA, there is recorded servo data, which is used to control positioning of the head 2 at the time of producing the HDD in advance.

As shown in FIG. 1, a read signal, which corresponds to servo data read by the head 2, is input to the FWR 8 through the head amplifier 4, the VGA 5, and the LPF 6. The AGC circuit 9 generates and outputs a gain control signal (DC voltage) in accordance with a level of the read signal rectified by the FWR 8.

The A/D converter 10 converts the gain control signal from the AGC circuit 9 to a digital data CV to be output to the CPU 11. Thereby, the CPU 11 measures a level value CV of the gain control signal, which corresponds to each of the designated head number m (m=0) and the zone number n (n=0) (step S6). The CPU 11 measures the level values CV of the gain control signals sent from the plurality of the servo areas SA and the plurality of the tracks, and calculates an average value (step S7).

Then, the CPU 11 multiplies the calculated average value (CV) of the level values of the gain control signals by a predetermined coefficient K so as to calculate threshold data (reference value data) DT (step S8).

The following will explain the definition of threshold data DT of this embodiment and the detection processing of the flying height variation.

As described above, if the amount of the flying height is varied, the level of the read signal is varied in accordance with the variation of the flying height. In other words, the amount of the flying height is increased, the level of the read signal is decreased. Conversely, the amount of the flying height is decreased, the level of the read signal is increased. Therefore, the amount of the flying height of the head 2 is varied, the level of the gain control signal is varied.

Threshold data DT shows the upper limit value (DT max) of the allowable range of the flying height variation of the head 2 and the lower limit value (DT min), that is, a reference value corresponding to the upper and lower limit values of the level variation of the gain control signal.

Therefore, the CPU 11 discriminates that the flying height of the head 2 is in the allowable range if the variation of the measured level value CV of the gain control signal is in the range of threshold data DT. Then, the CPU 11 discriminates that the flying height of the head 2 is in an abnormal flying height if the variation of the measured level value CV of the gain control signal is out of the range of threshold data DT, and outputs a detection signal FS of the flying height variation.

The following will shows a specific example for obtaining the coefficient K used to calculate threshold data DT.

As explained above, in a case where the amount of the flying height is d, and the writing wavelength of data is $\lambda$, the reading output of the head is EP (dB) is proportional to "=55*(d/$\lambda$)" (dB).

It is assumed that the amount of the flying height is "d=0.1 um" and the writing wavelength is "$\lambda$=0.5 um", an absolute value Ep (dB) of the read signal is "Ep (dB)=−55*(0.1/0.5) =−11 (dB)".

If the case that the amount of the flying height is varied 50% is abnormal, the upper limit amount of the flying height of the allowable range is "d1=0.05 um", and the lower limit amount thereof is "d1=0.15 um." Then, absolute values Ep1 (dB) and Ep2 (dB) of the corresponding read signals are "Ep1=−55*(0.05/0.5)=−5.5 (dB)", and "EP2=−55*(0.15/ 0.5)=−16.5 (dB)", respectively.

In other words, the head output (level of the read signal) at the time of the flying height variation is varied by ±5.5 (dB). Due to this, the coefficients K for determining the upper and lower limits are (Kmax=1.88 time) and (Kmin= 0.53 time), respectively.

As mentioned above, the CPU 11 calculates threshold data DT of each of the zone numbers corresponding to each of the head numbers m so as to be stored in the memory 12 (steps S9 to S14).

As a result, as shown in FIG. 12, in the memory 12, a table of threshold data DT for determining the allowable range of the flying height variation of each of the head numbers and each of the zone numbers.

(Writing Inhibit Processing and Alarm Processing)

Figure 2:
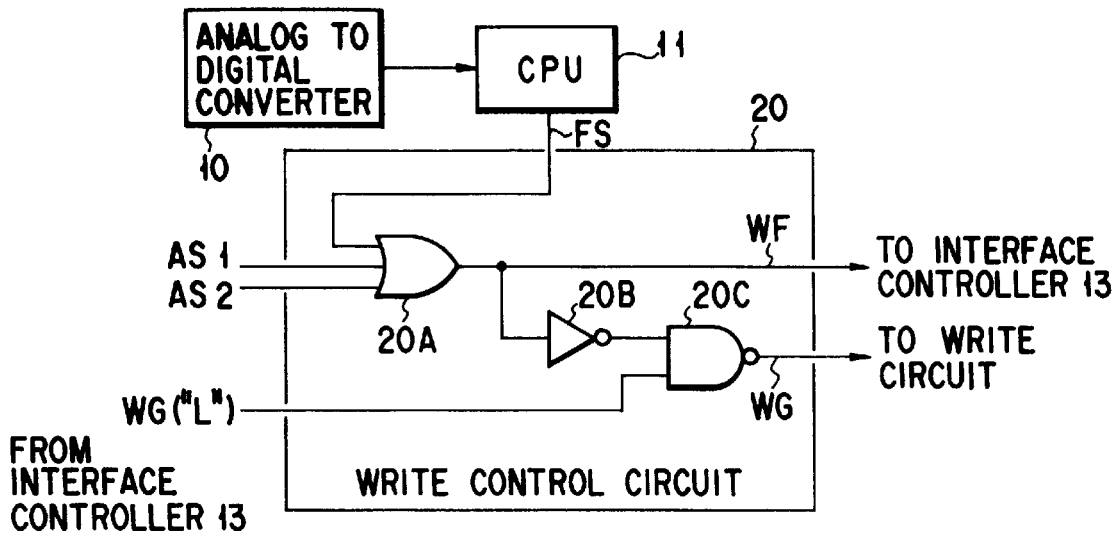
FIG. 2 is a block diagram showing a main part of write control circuit of a first embodiment of the present invention.
Figure 7:
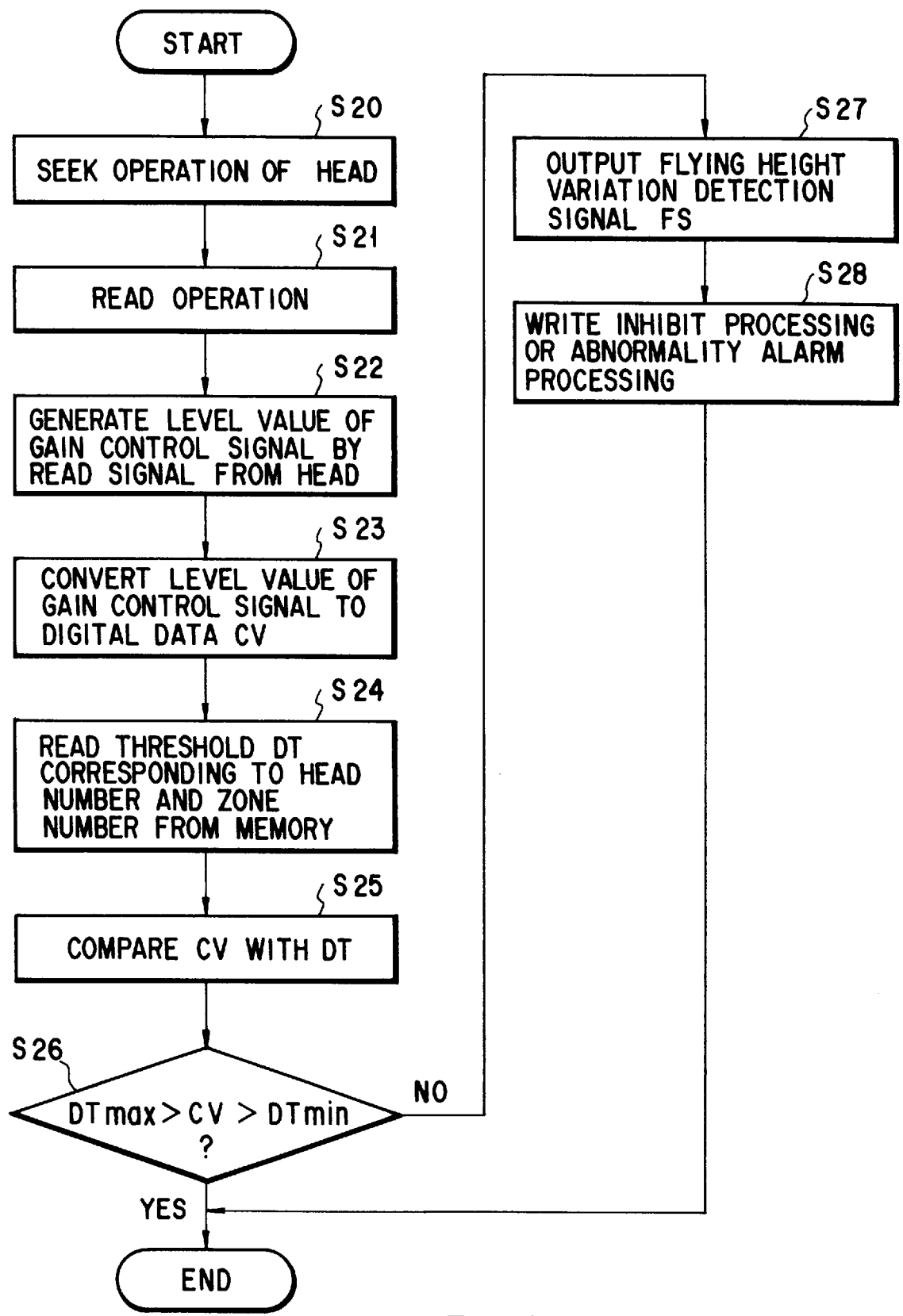
FIG. 7 is a flow chart explaining an operation of the first embodiment of the present invention.

The following will explain the detection processing of the flying height variation using the above-mentioned threshold data DT in the first embodiment with reference to FIGS. 2 and 7.

First, if a physical address corresponding to a logical address to be accessed is set, the CPU 11 seeks the head 2 having head number m forming the physical address up to zone zn including a target track number to be accessed (step S20).

The CPU 11 controls the head 2 to be positioned on the target track based on servo data, which is read from the servo area SA by the head 2. At this time, by the read operation of the head 2, the read signal corresponding to the read servo data is input to the data read processing circuit (step S21).

As described above, in the data read processing circuit, the AGC circuit 9 generates the gain control signal (DC voltage) corresponding to the level of the read signal (servo data) (step S22).

The CPU 11 inputs digital data CV corresponding to the gain control signal through the A/D converter 9 so as to measure the level variation of the gain control signal (step S23). The CPU 11 searches threshold data DT (DT0 to DTN) corresponding to the head number and the zone number from table of threshold data stored in the memory 12 (see FIG. 5) to be fetched (step S24).

Moreover, the CPU 11 compares the level value CV of the gain control signal with threshold data DT so as to check whether or not the level value CV of the gain control signal is included in the allowable range (the range of the upper and lower limit values DTmax and DTmin) shown by threshold data DT (steps S25 and S26).

If the level value CV is out of the allowable range, the CPU 11 determines that the amount of the flying height of the head 2 is abnormally varied, so as to output the detection signal FS of the flying height variation to the interface controller 13 (step S27).

The interface controller 13 executes the write inhibit processing or the abnormality alarm processing in accordance with the input of the detection signal FS of the flying height variation (step S28).

In the abnormality alarm processing, the interface controller 13 notifies the host computer that abnormality is generated in the HDD so that an writing/reading error of data is generated. By the host computer, on a screen of a display, it is displayed that abnormality is generated in the HDD. Thereby, a user can confirm the generation of abnormality of the HDD from the screen of the display.

As mentioned above, in the case of the abnormal flying height of the head, there is high possibility that the writing/reading operation of data will be erroneously operated. Due to this, the operation of the HDD is stopped by the operation of the host computer or that of the user, so that data can be protected.

On the other hand, as shown in FIG. 2, in the write inhibit processing, the detection signal FS of the flying height variation sent from the CPU 11 is input to a write controlling circuit 20.

The write controlling circuit 20 comprises an OR gate 20a, an inverter 20b, and a NAND gate 20c. The write controlling circuit 20 controls a write gate WG (logic level "L" is active), which is output from the interface controller 13 at the time of the generation of abnormality, so as to inhibit the writing operation.

In addition to the detection signal FS of the flying height variation, for example, abnormality detection signals such as an abnormality detection signal AS1, which is sent from a power source detecting circuit, a collision detection signal AS2 of the head 2 are input to the OR gate 20a.

The write gate WG, which is output from the interface controller 13, is input to a first input terminal of the NAND gate 20c. In this case, if the detection signal FS of the flying height variation whose logical level is "H", the logical level of the output of the NAND 20c is "H." Therefore, the output of the write gate WG whose logical level is "L" is inhibited.

In the case where the amount of the flying height of the head is varied and the abnormal flying height of the head is generated, the writing operation of data is inhibited by the write controlling circuit 20. Particularly, in a case where the amount of the flying height of the head exceeds the allowable range, the writing magnetic field of the magnetic flux to the disk cannot be sufficiently obtained. As a result, there is high possibility that the writing magnetization of data will be worsen. In this case, since the writing operation is inhibited, data can be prevented from being recorded in a state of an incomplete recording magnetization. Due to this, breakage of data can be prevented in advance.

In the case that the writing operation of data is inhibited, the abnormality of the writing operation is of course notified to the host computer from the interface controller 13.

(Retry Processing of Data Writing/Reading Operation)

According to a second embodiment, in a case that the abnormal flying height of the head 2 is detected, the CPU 11 executes the processing of the case of the writing operation and the processing of the case of the reading operation, separately in the data writing/reading operation.

More specifically, as shown in the flow chart of FIG. 8, the CPU 11 monitors the level value of the gain control signal in accordance with the read signal from the head 2 to measure the level value CV of the gain control signal, which is out of the allowable range in connection with threshold data DT. Thereby, an operation mode of the data writing/reading operation (steps S30 to S33) can be determined.

In other words, when the abnormal flying height is generated by the flying height variation of the head, the CPU 11 executes a write retry processing of data if the mode is the write operation mode (YES of step S33 and step S34).

The write retry processing is executed by use of cache data stored in a cache memory of the interface controller 13. Thereafter, the CPU 11 outputs the detection signal FS of the flying height variation, and inhibits the above-mentioned writing operation (step S37).

Similarly, when the abnormal flying height is generated by the flying height variation of the head, the CPU 11 executes a read retry processing of data if the mode is the read operation mode (YES of step S35 and step S36). In the read retry processing, the CPU 11 changes various kinds of parameters (e.g., parameter of LPF 6) of the data read processing circuit so as to execute the read retry processing of data.

Thereafter, the CPU 11 outputs the detection signal FS of the flying height variation, and executes the above-mentioned abnormality alarm processing (step S37).

As mentioned above, according to the second embodiment of the present invention, the write retry processing or the read retry processing is executed at the time when the abnormal flying height of the head 2 is detected. Thereby, the data writing abnormality or the generation of the read error can be minimized.

Then, by outputting the flying height variation detection signal FS after the write retry processing or the read retry processing, the error processing such as the write inhibit processing or the abnormality alarm processing is executed. Thereby, the data writing abnormality after the detection of the abnormal flying height or the generation of the read error can be prevented.

(Detection of Average Value of Flying Height Variation and Write Inhibit Flag)

A third embodiment of the present invention is a system in which the data write inhibit processing is executed in a case where the abnormal flying height of the head 2 is detected and the CPU 11 sets a write inhibit flag in an internal register in advance.

Moreover, the third embodiment of the present invention is a system in which the average value of the level value CV of the gain control signal is calculated to check the abnormal flying height of the head 2.

Figure 9:
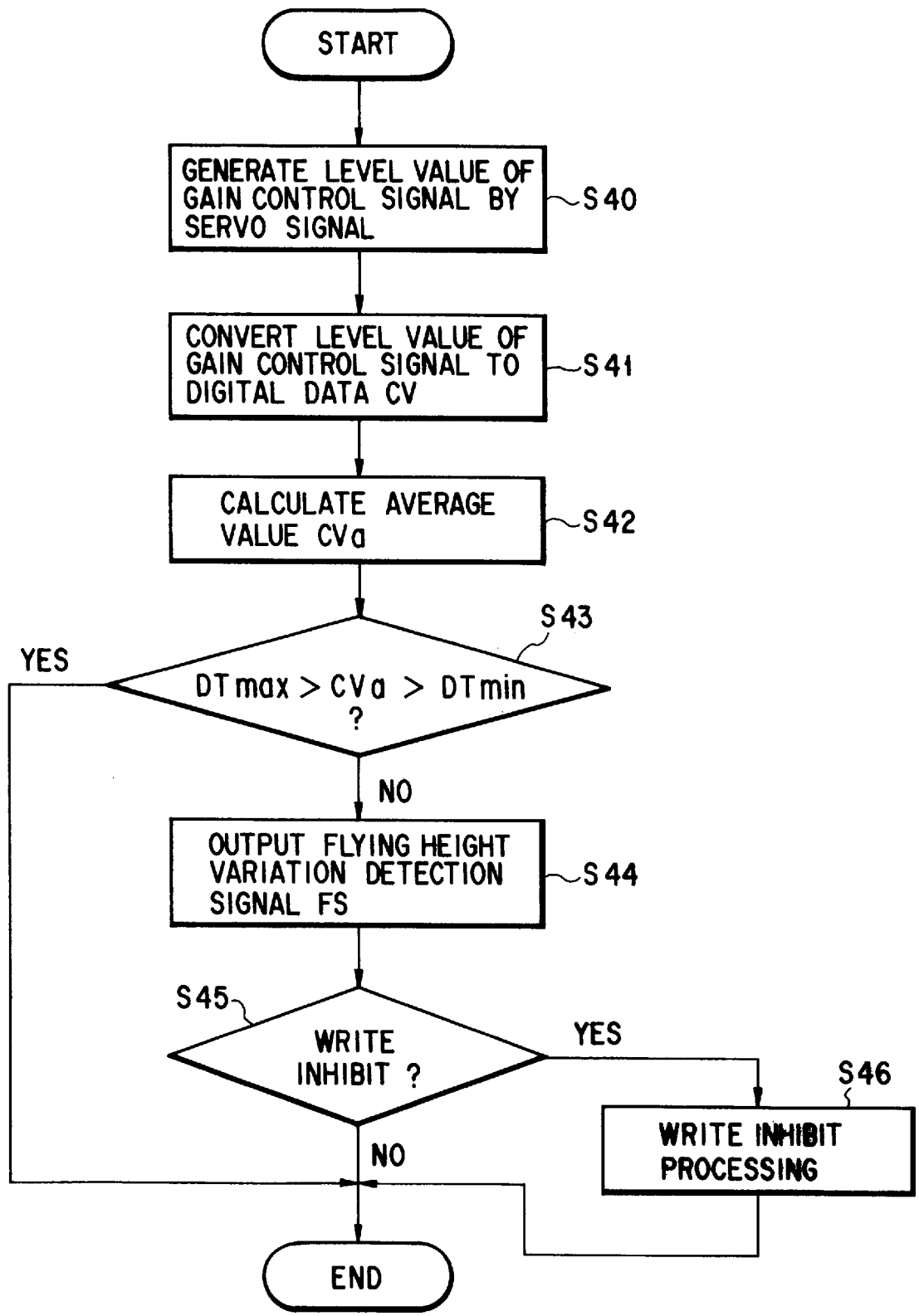
FIG. 9 is a flow chart explaining an operation of a third embodiment of the present invention.

More specifically, as shown in the flow chart of FIG. 9, if the level values CV of the gain control signals are measured in accordance with the read signal sent from the head 2, the CPU 11 calculates the average value CVa (steps S40 to S42). The CPU 11 executes a predetermined number of measuring times so as to measure the level value of the gain control signal for one circumference of the track, thereby calculating the average value CVa.

The CPU 11 compares the calculated average value CVa with threshold data DT so as to check whether or not the level value CV of the gain control signal is included in the allowable range shown by threshold data DT (step S43).

If the level value CV is out of the range, the CPU 11 determines that the amount of the flying height of the head 2 is abnormally varied, and outputs the detection signal FS of the flying height variation to the interface controller 13 (step S44).

In this case, the CPU 11 executes the above-mentioned data write inhibit processing in a case where the write inhibit flag WP is set in the internal register as shown in FIG. 11 (YES of step S45 and step S46).

The write inhibit flag WP is set from the host computer through e.g., the interface controller 13. If the write inhibit flag WP is not set, the data write operation is not inhibited in the case where the the abnormal flying height of the head is generated. However, the abnormality alarm processing is executed.

(Abnormality Detection Processing of Plurality of Zones)

A fourth embodiment of the present invention will explain the following system.

More specifically, when the abnormal flying height is detected by the corresponding zone number, the flag is set in the internal register, and the flag of the other zone number belonging to the same head number is checked. Then, the CPU 11 outputs the detection signal FS of the flying height variation when the abnormal flying height is generated in the plurality of the zones.

Figure 10:
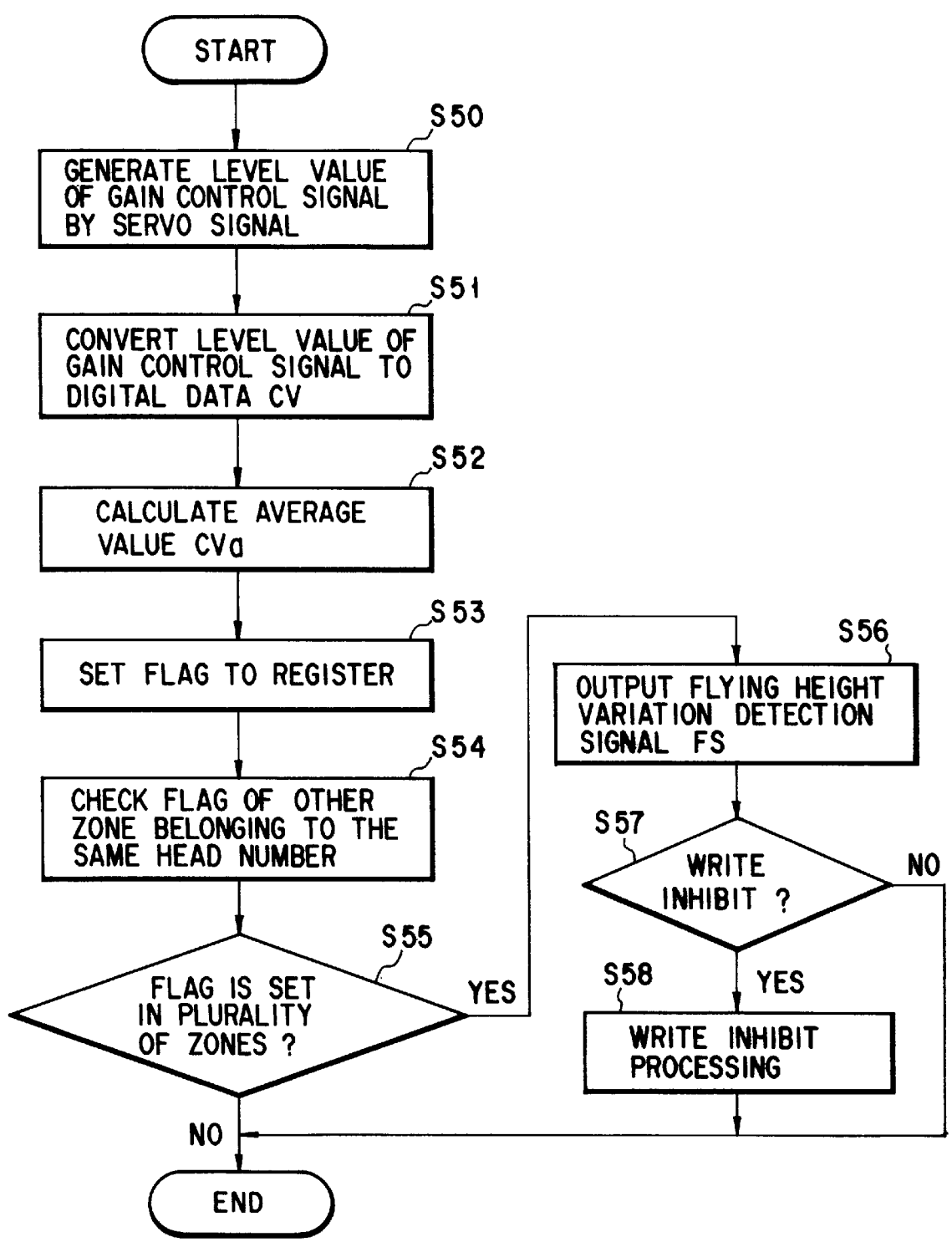
FIG. 10 is a flow chart explaining an operation of a fourth embodiment of the present invention.

In other words, as shown in the flow chart of FIG. 10, if the level values CV of the gain control signals are measured in accordance with the read signal sent from the head 2, the CPU 11 calculates the average value CVa (steps S50 to S52).

The CPU 11 executes a predetermined number of measuring times so as to measure the level value of the gain control signal for one circumference of the track, thereby calculating the average value CVa.

The CPU 11 compares the calculated average value CVa with threshold data DT so as to check whether or not the level value CV of the gain control signal is included in the allowable range shown by threshold data DT (step S43).

If the level value CV is out of the range, the CPU 11 sets the flag (bit "1") in the area of the internal register corresponding to the head number (m) and the zone number (1) (step S53).

Next, the CPU 11 searches the internal register to check the flag of the other zone number belonging to the same head number (m) (step S54). By the check processing, if the flag is set in the plurality of the zones (in this case, numbers 1 and 2) belong to the same head number (m), the CPU 11 outputs the flying height variation detection signal FS (YES of step S55 and step S56).

Similarly, if the write inhibit flag WP is set in the internal register, the CPU 11 executes the data write inhibit processing (YES of step S57, and step S58).

As mentioned above, according to the fourth embodiment of the present invention, in the case were the abnormal flying height of the selected head 2 whose head number is (m) is detected at the zone number sought by the head 2, the CPU 11 sets the flag to the internal register so as to check the presence of the flag corresponding to the other zone number belonging to the same head number.

As a result of the check, if the flag is set in the other zone number, that is, the abnormal flying height is generated in the other plurality of zones, the CPU 11 generates the detection signal FS of the flying height variation.

By the above-mentioned system, it is checked whether the abnormal flying height of the head 2 is generated constantly or accidentally. If it is checked that the abnormal flying height of the head 2 is constantly generated in the plurality of the zones, the CPU 11 outputs the detection signal FS of the flying height variation. Therefore, the abnormal flying height of the head 2 can be surely confirmed, so that the operation can be moved to the abnormality processing for stopping the operation of the HDD.

As mentioned above, according to the present invention, the AGC voltage of the data reading processing circuit is measured, thereby checking the flying height variation of the head to detect the abnormal flying height state without using the complicated measuring circuit. Therefore, the generation of the abnormal data writing/reading operation, which is caused by the abnormal flying height state, can be prevented in advance, with the result that data writing/reading operation can be surely realized.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus including a disk as a recording medium and a head wherein said head reads and writes data from and to said disk in a state that said head is flying above a surface of the disk, said apparatus comprising:

amplifying means having an automatic gain control function of generating a gain control signal for automatically varying a gain based on a level of a read signal output from said head, for maintaining the level of said read signal output from said head at a predetermined level when data is read from said disk by said head;

monitoring means for monitoring the level of said gain control signal; and detecting means for detecting whether said level of said gain control signal is abnormally varied from said predetermined level when a flying height of said head is abnormally varied from a predetermined flying height.

2. The apparatus according to claim 1, wherein said amplifying means comprises a variable gain amplifier having a function of varying the gain in accordance with said gain control signal, and an automatic gain control circuit for generating said gain control signal having a direct current component from said read signal, and said monitoring means comprises an analog to digital converter for sampling a direct current level of said gain control signal to have a predetermined distance so as to convert said direct current level to digital data.

3. The apparatus according to claim 2, further comprising memory means for storing reference value data of pre-measured levels of said gain control signal, said levels corresponding to flying heights of said head, wherein levels that are abnormally varied from said predetermined level are identified, said level of said gain control signal being compared with said reference value data, said detecting means outputting a detection signal when the level of said gain control signal is abnormally varied from said predetermined level.

4. The apparatus according to claim 1, further comprising:
write inhibit control means for preventing data from being written to said disk by said head when said detecting means outputs a detection signal, said detecting means outputting a detection signal when the level of said gain control signal is abnormally varied from said predetermined level.

5. The apparatus of claim 1, further comprising:
alarm means for generating an alarm when said detecting means outputs a detection signal, said detecting means outputting a detection signal when the level of said gain control signal is abnormally varied from said predetermined level.

6. The apparatus according to claim 1, wherein said detecting means outputs a detection signal when the level of said gain control signal is abnormally varied from said predetermined level.

7. A method for detecting a flying height variation of a head in a disk storage system wherein said head reads or writes data from or to said disk in a state that said head is flying above a surface of the disk, and an automatic gain control function is provided to generate a gain control signal for automatically varying a gain based on a level of a read signal output from said head so as to maintain the level of said read signal output from said head to be a predetermined level when data is read from said disk by said head, said method comprising the steps of:

sequentially seeking said head to a plurality of zones formed in said disk so as to measure the level of said gain control signal of each of said zones in accordance with said read signal;

calculating an average value of said gain control signal of each of said zones;

calculating each of coefficients in accordance with upper and lower limit values defining an allowable range of said flying height to calculate each of upper and lower limit threshold values, serving as said reference value data, obtained by multiplying the level value of said gain control signal by said each of coefficients;

storing reference value data of each of said zones to memory means; and outputting a detection signal showing that the flying height of the head is varied out of the allowable range when the level value of said gain control signal is detected in accordance with the level of the read signal output from said head at the time of data reading or writing operation, said reference value data corresponding to the zone where said head is positioned is read from said memory means, and the level value of said gain control signal exceeds a predetermined allowable range defined by said reference value data.

8. A disk storage system including a disk as a recording medium and a head that reads and writes data from and to the disk in a flying state above a surface of the disk, the system comprising:

an amplifying means having an automatic gain control function of generating a gain control signal for automatically varying a gain based on a level of a read signal output from the head, for maintaining the level of the read signal output from the head at a predetermined level when data is read from the disk by the head;

an A/D converter for converting a level of the gain control signal to digital data; and a microprocessor, said microprocessor comparing the level of said gain control signal with reference value data of pre-measured levels of said gain control signal corresponding to flying heights of said head, determining whether said level is abnormally varied from said predetermined level, and outputting a detection signal when the level of said gain control signal is abnormally varied from said predetermined level.

* * * * *